United States Patent [19]
Willford et al.

[11] Patent Number: 5,566,579
[45] Date of Patent: Oct. 22, 1996

[54] VEHICLE TRANSMISSION HAVING MANUALLY SHIFTED LOWER GEARS AND AUTOMATICALLY SHIFTED HIGHER GEARS

[75] Inventors: George A. Willford, Waterville; Kurt R. Baer; John M. Loeffler, both of Toledo, all of Ohio; Dennis D. Schwaiger, Whitmore Lake, Mich.

[73] Assignee: Dana Corporation, Toledo, Ohio

[21] Appl. No.: 461,190

[22] Filed: Jun. 5, 1995

Related U.S. Application Data

[62] Division of Ser. No. 147,283, Nov. 3, 1993.

[51] Int. Cl.⁶ .................................................. F16H 61/00
[52] U.S. Cl. ........................ 74/335; 74/473 R; 74/477; 340/456
[58] Field of Search ........................ 74/335, 473 R, 74/477, DIG. 7; 340/456

[56] References Cited

U.S. PATENT DOCUMENTS

| | | |
|---|---|---|
| 2,637,221 | 5/1953 | Backus et al. . |
| 2,637,222 | 5/1953 | Backus . |
| 2,654,268 | 10/1953 | Perkins . |
| 2,892,358 | 6/1959 | Backus et al. . |
| 4,324,153 | 4/1982 | Sugimoto et al. . |
| 4,561,325 | 12/1985 | Jester . |
| 4,633,725 | 1/1987 | Jones ............................... 74/473 R |
| 4,722,248 | 2/1988 | Braun . |
| 4,928,544 | 5/1990 | Markyvech et al. ................. 74/335 |
| 5,031,472 | 7/1991 | Dutson et al. ..................... 74/335 |
| 5,038,627 | 8/1991 | Schwaiger et al. ................. 74/335 |

Primary Examiner—Rodney H. Bonck
Assistant Examiner—Troy Grabow
Attorney, Agent, or Firm—MacMillan, Sobanski & Todd

[57] ABSTRACT

A transmission includes a plurality of shift rails, each of which is axially movable forwardly and rearwardly from a center neutral position to respective gear engaging positions. The lower shift rails are provided for manual shifting among the lower gear ratios of the transmission. The highest shift rail is provided for selective manual or automatic shifting among the highest two gear ratios of the transmission. An idler rail is disposed adjacent to the highest shift rail. For manual shifting, the idler rail is connected to the highest shift rail, and a manually operable shift lever is used to move both the idler rail and the highest shift rail. For automatic shifting, the idler rail is disconnected from the highest shift rail, and an automatic shift member is moved into cooperation with the highest shift rail. Rotation of the automatic shift shaft causes corresponding movement of the automatic shift member. An electronic controller is provided for controlling the automatic shifting of the transmission in response to sensed operating conditions of the vehicle. A circuit is provided for sensing the rotational position of the automatic shift shaft and for generating an electrical signal which is representative of the actual position thereof, which is also representative of the actual position of the highest shift rail, to the electronic controller.

20 Claims, 10 Drawing Sheets

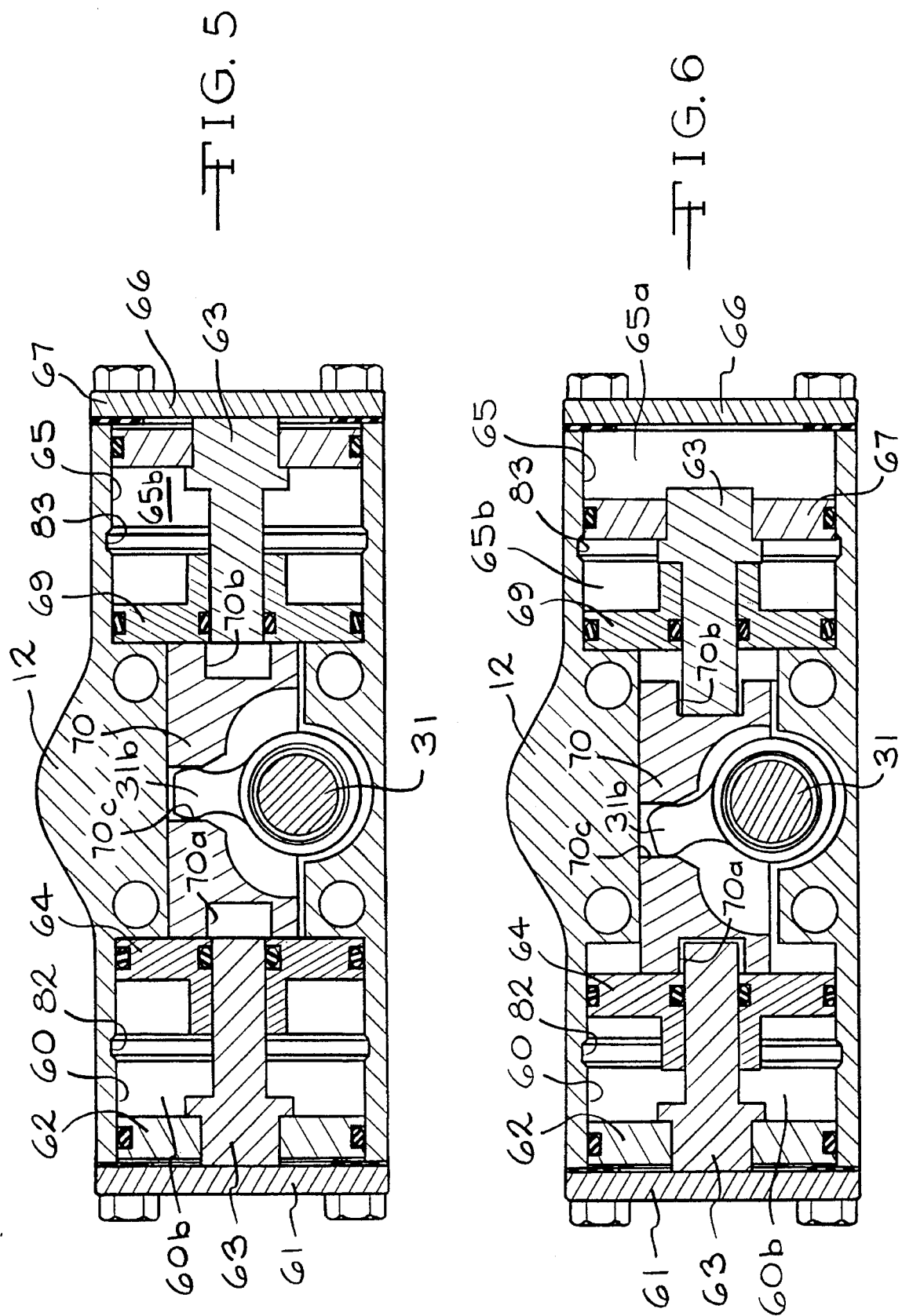

VEHICLE TRANSMISSION HAVING MANUALLY SHIFTED LOWER GEARS AND AUTOMATICALLY SHIFTED HIGHER GEARS

This is a divisional of copending application Ser. No. 08/147,283 filed on Nov. 3, 1993.

BACKGROUND OF THE INVENTION

This invention relates in general to vehicle transmissions and in particular to an improved transmission structure wherein the lower gear ratios are shifted manually and wherein the higher gear ratios can be shifted either manually or automatically as desired.

In most vehicles, a transmission is provided in the drive train between the engine and the driven wheels. As is well known, the transmission includes a case containing an input shaft, an output shaft, and a plurality of meshing gears. Means are provided for connecting selected ones of the meshing gears between the input shaft and the output shaft to provide a desired speed reduction gear ratio therebetween. The meshing gears contained within the transmission case are of varying size so as to provide a plurality of such gear ratios. By appropriate selection of these gear ratios, acceleration and deceleration of the vehicle can be accomplished in a smooth and efficient manner.

Many transmission structures are known in the art for performing this gear ratio selection manually, i.e., in response to some physical exertion by the vehicle driver. In a conventional manual transmission, the driver grasps and moves an upper portion of a pivotable shift lever. In response thereto, a lower portion of the shift lever is moved into selective engagement with one of a plurality of shift rails provided within the transmission. Thus, movement of the shift lever causes movement of the selected one of the shift rails. Movement of the selected shift rail causes certain ones of the meshing gears to be connected between the input shaft and the output shaft so as to provide the desired gear ratio therebetween.

Many transmission structures are also known in the art for performing this gear ratio selection automatically, i.e., without any physical exertion by the vehicle driver. In a conventional automatic transmission, the shift rails are typically replaced by a plurality of hydraulically or pneumatically actuated structures. In response to predetermined operating conditions, these structures cause certain ones of the meshing gears to be connected between the input shaft and the output shaft so as to provide the desired gear ratio therebetween. Although automatic transmissions offer the advantages of increased convenience of use and reduced fatigue for the driver, manual transmissions provide the advantages of decreased cost, increased torque capacity, and better fuel economy. Because of this, the majority of medium and heavy duty truck transmissions in common use today are manual transmissions.

In order to improve the convenience of use of manual transmissions, various structures have been proposed for fully or partially automating the shifting of an otherwise conventional manual transmission. In a fully automated manual transmission, the conventional driver operated shift lever is usually replaced by one or more hydraulically or pneumatically controlled automatic shifting mechanisms. The components of the fully automatic transmission function to shift all of the shift rails within the transmission throughout all of the gear ratios. In a partially automated manual transmission, the conventional driver operated shift lever is usually supplemented with one or more hydraulically or pneumatically controlled automatic shifting mechanisms. The components of the partially automated transmission function to shift only a selected few of the shift rails within the transmission throughout the selected few of the gear ratios which are available from such shift rails. Typically, the lower gear ratios are manually selected by the vehicle driver, while the higher gear ratios are automatically selected. Such an approach is advantageous because the partially automated transmission is lower in cost than a comparable fully automated manual transmission, yet offers automatic shifting in the higher gear ratios where the majority of shifting between gears normally occurs.

As mentioned above, various structures have been proposed for fully or partially automating the shifting of an otherwise conventional manual transmission. However, such known structures have been found to be unduly complicated and expensive. Thus, it would be desirable to provide an improved partially automated transmission which is simpler and less expensive than known structures.

SUMMARY OF THE INVENTION

This invention relates to an improved transmission structure wherein the lower gear ratios are shifted manually and wherein the higher gear ratios can be shifted either manually or automatically as desired. The transmission includes a plurality of shift rails, each of which is axially movable forwardly and rearwardly from a center neutral position to respective gear engaging positions. The lower shift rails are provided for manual shifting among the lower gear ratios of the transmission. The highest shift rail is provided for selective manual or automatic shifting among the highest two gear ratios of the transmission. To accomplish this, an idler rail is disposed adjacent to the highest shift rail. Means are provided for selectively connecting the idler rail to the highest shift rail for axial movement therewith. For manual shifting, the idler rail is initially connected to the highest shift rail for axial movement therewith. Then, a manually operable shift lever is used to move the idler rail, as well as the highest shift rail connected thereto, among the highest two gear ratios of the transmission. For automatic shifting, the idler rail is initially disconnected from the highest shift rail. At the same time, an automatic shift member mounted on a rotatable automatic shift shaft is moved into cooperation with the highest shift rail. Rotation of the automatic shift shaft causes corresponding movement of the automatic shift member. As a result, the highest shift rail is moved among the highest two gear ratios of the transmission. An electronic controller is provided for controlling the automatic shifting of the transmission in response to sensed operating conditions of the vehicle. Means are provided for sensing the rotational position of the automatic shift shaft and for generating an electrical signal which is representative of the actual position thereof, which is also representative of the actual position of the highest shift rail, to the electronic controller.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is a rear sectional view taken along line 5—5 of FIG. 4 showing the components of the automatic shifting assembly in a neutral position.

FIG. 6 is a rear sectional view similar to FIG. 5 showing the components of the automatic shifting assembly in a gear engaging position.

DETAILED DESCRIPTION OF THE PREFERRED EMBODIMENT

1. Basic Transmission Structure

Figure 1:
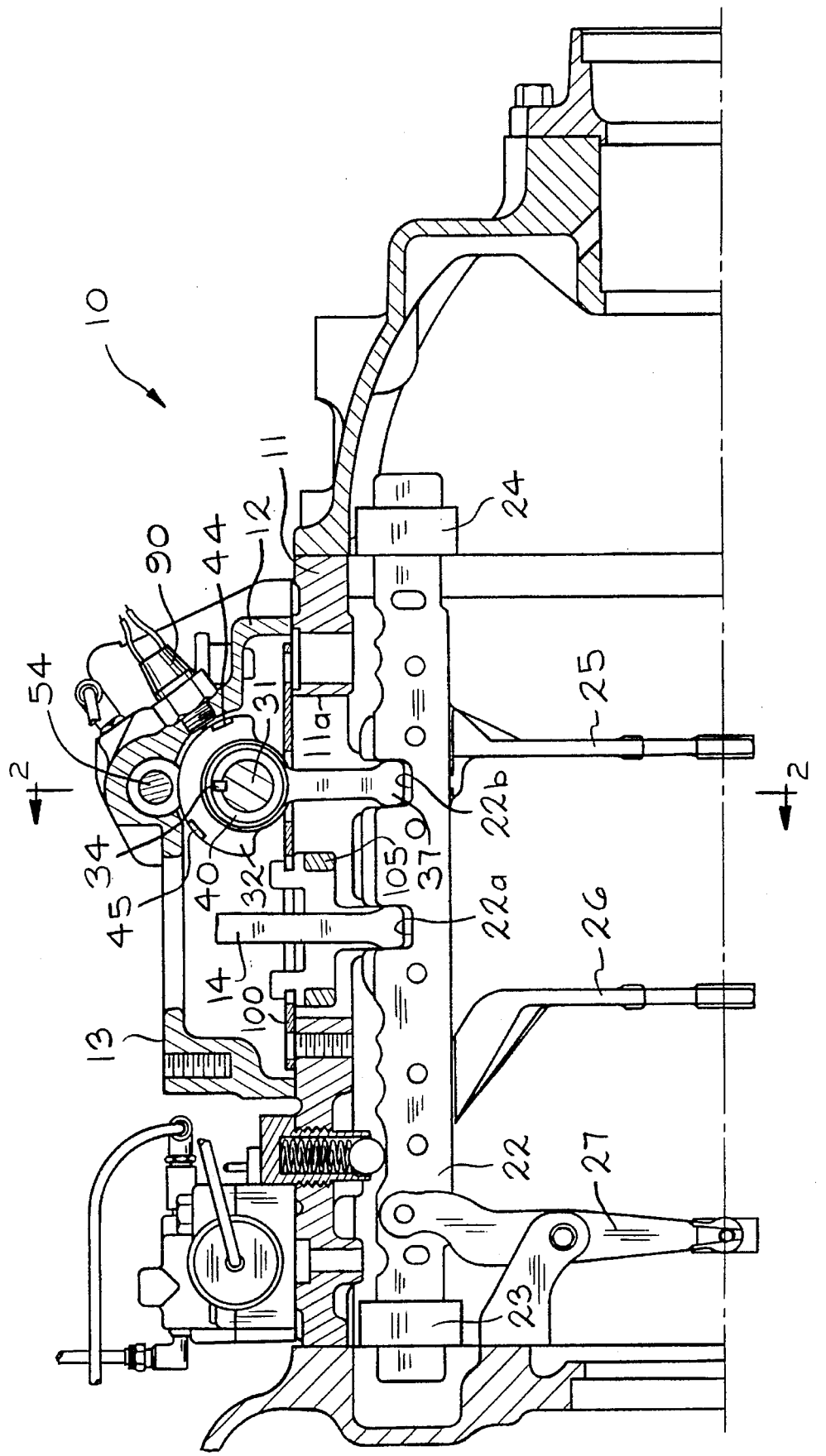
FIG. 1 is a fragmentary side elevational view, partially in cross section, of the top portion of a vehicle transmission in accordance with this invention.

Referring now to the drawings, FIGS. 1 through 4 illustrate the basic structure of an upper portion of a vehicle transmission, indicated generally at 10, in accordance with this invention. The non-illustrated lower portion of the transmission 10, which includes a plurality of meshing gears mounted on main and counter shafts, is conventional in the art and is so well known that a discussion thereof is not necessary for a full and complete understanding of this invention. The transmission 10 includes a case 11 having an opening 11a formed through the upper portion thereof. A shift housing 12 is secured to the upper portion of the case 11 about the opening 11a by any conventional means. The upper surface of the shift housing 12 has a mounting surface 13 defined thereon, to which a conventional shift tower assembly (not shown) can be secured by any conventional means.

As is well known, a manually operable shift lever (a lower end of which is illustrated at 14 in FIG. 1) is mounted on the shift tower assembly for pivoting movement relative thereto. The upper end of the shift lever 14 extends upwardly into a vehicle cab (not shown) where it can be easily grasped and moved by a driver. The lower end of the shift lever 14 extends downwardly through the shift housing 12 and the opening 11a formed through the case 11 into the transmission 10. Alternatively, the manually operable shift lever 14 may be replaced by a conventional remote actuator (not shown) having a lower end which also extends downwardly through the shift housing 12 and the opening 11a into the transmission 10.

Figure 2:
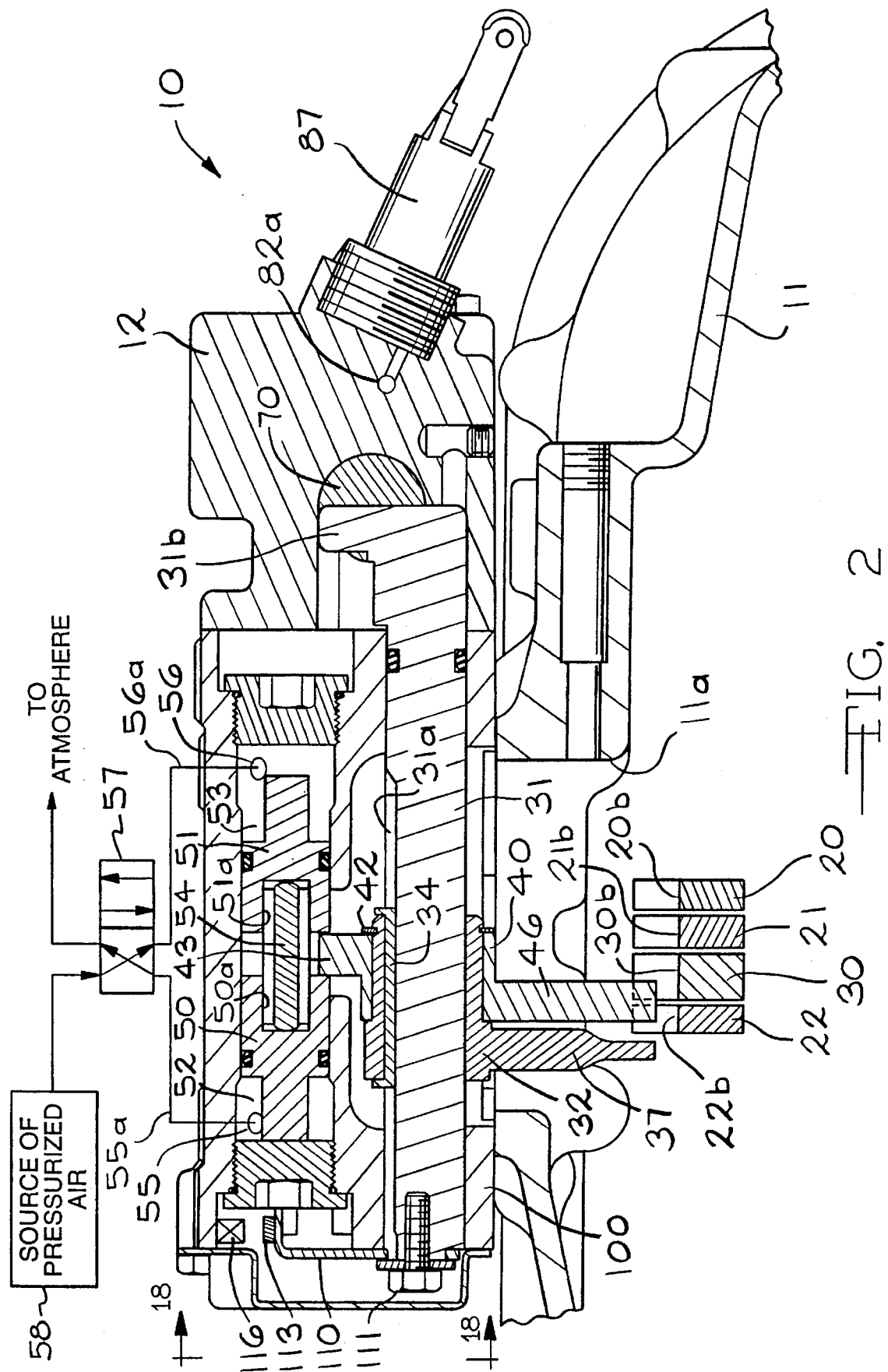
FIG. 2 is a rear end sectional view taken along line 2—2 of FIG. 1 showing the components of a manual/automatic selector assembly in a first position for operation in a manual shifting mode, and further showing a simplified schematic diagram of a fluid actuated control circuit in a first operating condition.
Figure 3:
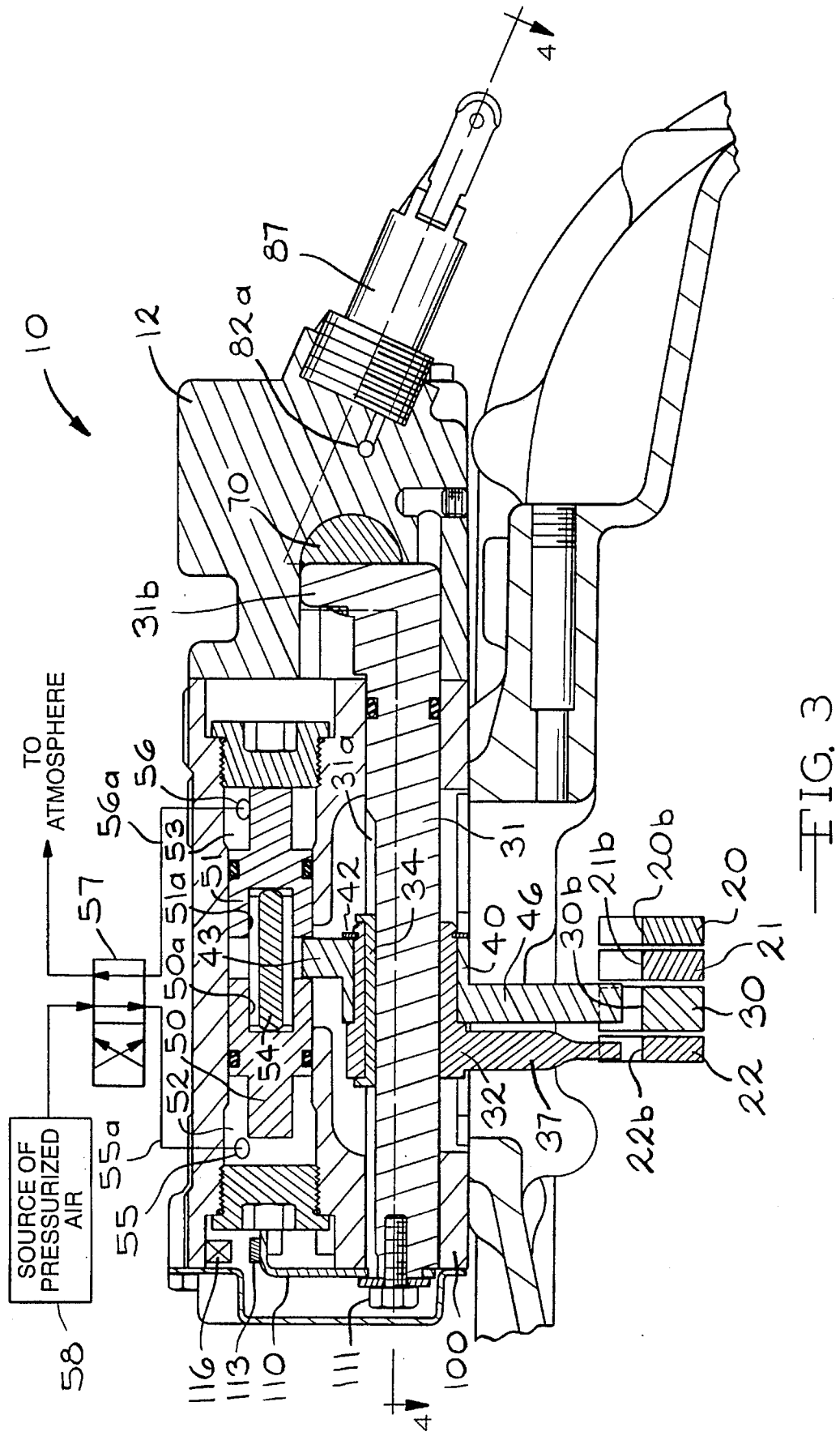
FIG. 3 is a rear end sectional view similar to FIG. 2 showing the components of the manual/automatic selector assembly in a second position for operation in an automatic shifting mode, and further showing the associated simplified schematic diagram of the fluid actuated control circuit in a second operating condition.
Figure 4:
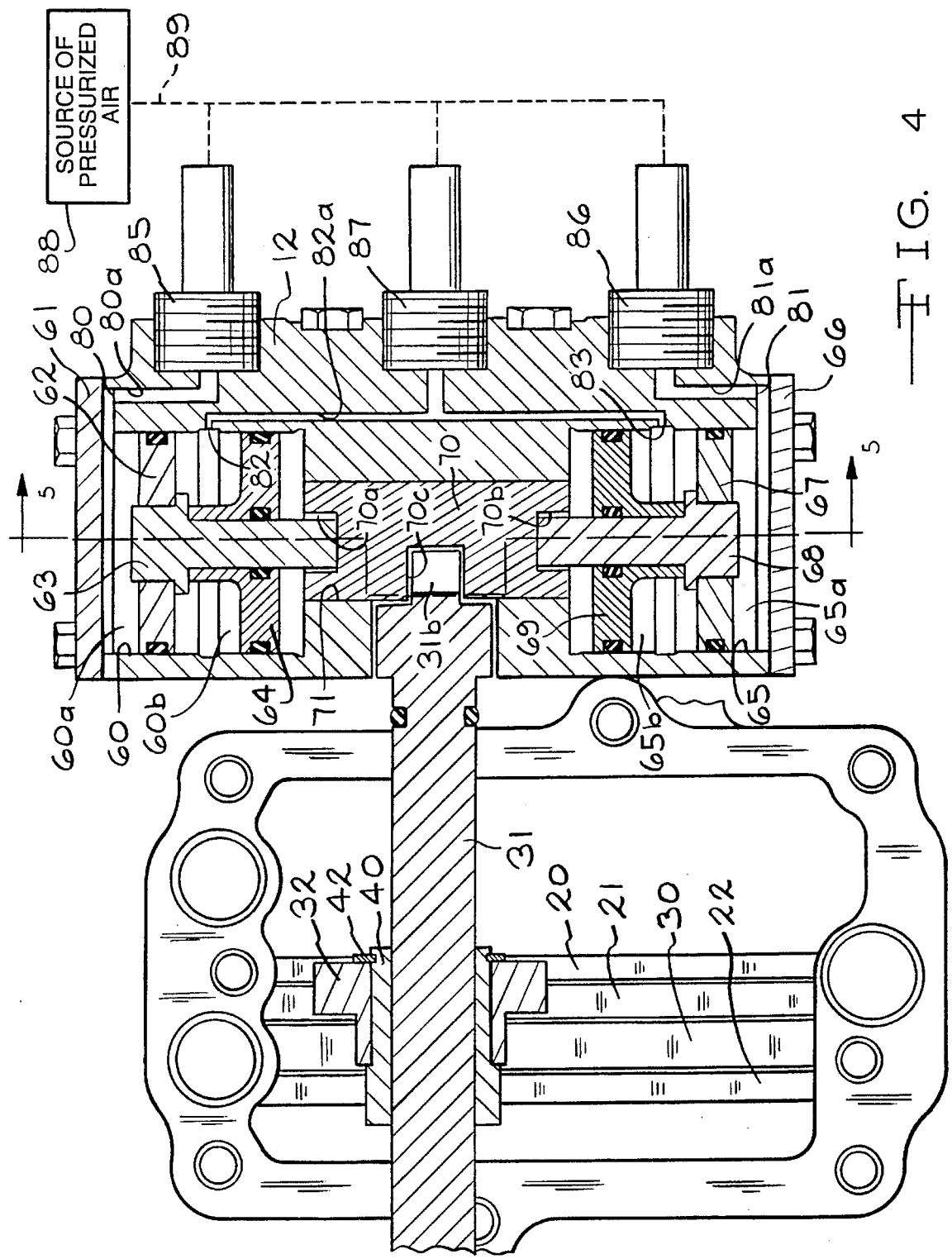
FIG. 4 is a top sectional view taken along line 4—4 of FIG. 3 of the manual/automatic selector assembly and an automatic shifting assembly.

As best shown in FIGS. 2, 3, and 4, a plurality of shift rails 20, 21, and 22 are provided within the transmission 10. The ends of the shift rails 20, 21, and 22 are respectively supported for axial movement by front and rear rail support members 23 and 24 (see FIG. 1). The front and rear rail support members 23 and 24 are secured to the transmission case 11 and have respective openings formed therethrough for slidably receiving the ends of the shift rails 20, 21, and 22 therein. Each of the shift rails 20, 21, and 22 is axially movable from a central neutral position to either a forward position (to the left when viewing FIG. 1) to engage a first gear ratio or to a rearward position (toward the right when viewing FIG. 1) to engage a second gear ratio.

A forward notch 20a is formed in the upper surface of the first shift rail 20. Similarly, forward notches 21a and 22a are formed in the upper surfaces of the second and third shift rails 21 and 22, respectively. As best shown in FIG. 1, the forward notches 20a, 21a, and 22a are aligned with one another in a direction which is transverse to the longitudinal axes of the shift rails 20, 21, and 22 when such shift rails 20, 21, and 22 are all in their neutral positions. Similarly, rearward notches 20b, 21b, and 22b are respectively formed in the upper surfaces of the shift rails 20, 21, and 22. The rearward notches 20b, 21b, and 22b are also aligned with one another in a direction which is transverse to the longitudinal axes of the shift rails 20, 21, and 22 when such shift rails 20, 21, and 22 are all in their neutral positions. The purposes of the forward notches 20a, 21a, and 22a and the rearward notches 20b, 21b, 22b will explained below.

A first shift fork 25 is connected to the first shift rail 20 by rivets or other conventional means for movement therewith. Similarly, a second shift fork 26 is connected to the second shift rail 21, and a third shift fork 27 is connected to the third shift rail 22. The shift forks 25, 26, and 27 extend downwardly from their associated shift rails 20, 21, and 22 into engagement with respective gear engaging mechanisms (not shown) provided in the lower portion of the transmission 10. The shift forks 25, 26, and 27 and the gear engaging mechanisms are conventional in the art.

The components of the transmission 10 thus far described constitute the basic structure of the main section of the transmission 10, which provides a predetermined number of speed reduction gear ratios between the input and output shafts thereof (not shown). In the illustrated embodiment, the first shift rail 20 is provided for shifting between reverse and first gear ratios, the second shift rail 21 is provided for shifting between second and third gear ratios, and the third shift rail 22 is provided for shifting between fourth and fifth gear ratios. Thus, the illustrated main section of the transmission 10 is a five-speed transmission.

The transmission 10 may, if desired, further include an auxiliary section (not shown) located rearwardly (toward the right when viewing FIG. 1) of the main section. The auxiliary section is conventional in the art and, similar to the main section, provides a predetermined number of gear ratios in a known manner. The output shaft of the main section constitutes the input shaft to the auxiliary section. Thus, as is well known, the total number of gear ratios available from the transmission 10 as a whole is equal to the product of the number of gear ratios available from the main section and the number of gear ratios available from the auxiliary section.

For example, if the auxiliary section of the transmission 10 described above is a conventional two-speed range section, then a total of ten forward gear ratios is available from the transmission 10 as a whole. When the range section of the transmission 10 is shifted to a low gear range, movement of the shift rails 20, 21, and 22 provides the five lower gear ratios as described above. When the range section of the transmission 10 is shifted to a high gear range, movement of the shift rails 20, 21, and 22 provides five additional higher gear ratios. In the high range, the first shift rail 20 is provided for shifting to the sixth gear ratio, the second shift rail 21 is provided for shifting between seventh and eighth gear ratios, and the third shift rail 22 is provided for shifting between ninth and tenth gear ratios. Although this invention will be described and illustrated in the context of the illustrated ten speed transmission 10 wherein shifting between the top two (ninth and tenth) gear ratios is selectively automated, it will be appreciated that this invention may be used in conjunction with any other conventional transmission structure, both single stage and compound.

2. Basic Transmission Operation

As discussed above, the shift tower assembly of the transmission 10 supports the shift lever 14 for pivoting movement therein. The upper end of the shift lever 14 extends upwardly into a vehicle cab where it can be easily grasped and moved by a driver. The lower end of the shift lever 14 extends downwardly through the shift housing 12 and the opening 11a into the transmission 10. In a conventional manual transmission, the lower end of the shift lever 14 would selectively cooperate with the forward notches 20a, 21a, and 22a respectively formed in the upper surfaces of the shift rails 20, 21, and 22. To operate such a conventional manual transmission, the driver would initially select one of the three shift rails 20, 21, and 22 for movement. This would be accomplished by initially pivoting the lower end of the shift lever 14 in a direction which is transverse to the longitudinal axes of the shift rails 20, 21, and 22. By appropriate pivoting movement in this selecting direction, the lower end of the shift lever 14 would be positioned in a single one of the notches 20a, 21a, and 22a of the shift rails 20, 21, and 22, respectively.

Following this initial selection movement, the driver would then shift the selected shift rail 20, 21, and 22 by pivoting the lower end of the shift lever 14 in a direction which is parallel to the longitudinal axes thereof. By appropriate pivoting movement in this shifting direction, the selected one of the shift rails 20, 21, and 22 would be moved axially forwardly or rearwardly from the central neutral position. As a result, one or the other of the gear ratios available from the selected shift rail 20, 21, and 22 would be engaged, as described above.

This invention, however, relates to a mechanism for permitting this selecting and shifting movement to occur not only manually, but also automatically so as to not require any manual effort on the part of the driver, as discussed above. In the illustrated embodiment, a mechanism for selective automatic shifting of the third shift rail 22 will be disclosed in detail. However, it will be appreciated that the selective automatic shifting structure of this invention could be easily adapted to effect shifting of any of the shift rails 20, 21, and 22. It will be further appreciated that the selective automatic shifting structure of this invention could also be adapted to effect shifting of more than one or all of the shift rails 20, 21, and 22 on an individual basis.

3. Idler Rail

The selective automatic shifting structure of this invention includes an idler rail 30 which, as best shown in FIGS. 2 through 4, is disposed between the second shift rail 21 and the third shift rail 22. As with the shift rails 20, 21, and 22, the ends of the idler rail 30 extend through respective openings formed through the front and rear rail support members 23 and 24. Thus, the idler rail 30 is also axially movable from a central neutral position to either a forward position (to the left when viewing FIG. 1) or to a rearward position (toward the right when viewing FIG. 1). Forward and rearward notches 30a and 30b are formed in the upper surface of the idler rail 30. The forward notch 30a is transversely aligned with the forward notches 20a, 21a, and 22a when all of the rails 20, 21, 22, and 30 are in their neutral positions. Similarly, the rearward notch 30b is transversely aligned with the rearward notches 20b, 21b, and 22b when all of the rails 20, 21, 22, and 30 are in their neutral positions.

Unlike the conventional manual transmission described above, the lower end of the shift lever 14 in the illustrated transmission 10 is prevented from cooperating with the forward notch 22a formed in the third shift rail 22. Rather, the lower end of the shift lever 14 is permitted to selectively cooperate only with the forward notches 20a, 21a, and 30a respectively formed in the upper surfaces of the rails 20, 21, and 30. The specific structure for accomplishing this, and the reasons therefor, will be explained below.

To manually operate the transmission 10, the driver initially selects one of the three rails 20, 21, and 30 for movement. This is accomplished by pivoting the lower end of the shift lever 14 in a direction which is transverse to the longitudinal axes of the rails 20, 21, and 30. By appropriate pivoting movement in this selecting direction, the lower end 14 of the shift lever is positioned in a single one of the forward notches 20a, 21a, and 30a formed in the rails 20, 21, and 30, respectively.

Following this initial selection movement, the driver then shifts the selected rail 20, 21, and 30 by pivoting the lower end of the shift lever 14 in a direction which is parallel to the longitudinal axes thereof. By appropriate pivoting movement in this shifting direction, the selected one of the rails 20, 21, and 30 is then moved axially forwardly or rearwardly from the central neutral position. When the first shift rail 20 is selected and shifted in this manner, one or the other of the lowest gear ratios available therefrom are engaged, as described above. Similarly, when the second shift rail 21 is selected and shifted in this manner, one or the other of the intermediate gear ratios available therefrom are engaged. However, unlike the shift rails 20 and 21, the idler rail 30 is not provided with a shift fork or other means for engaging a gear engaging mechanism when moved. Rather, means are provided for selectively connecting the idler rail 30 to the third shift rail 22 such that movement of the idler rail 30 causes corresponding movement of the third shift rail 22. As a result, one or the other of the highest gear ratios available from movement of the third shift rail 22 are engaged.

4. Manual/Automatic Selector Assembly

As best shown in FIGS. 2 and 3, a manual/automatic selector assembly is provided for selectively connecting the idler rail 30 to the third shift rail 22. The manual/automatic selector assembly includes an automatic shift shaft 31 which is rotatably supported within the shift housing 12 of the transmission 10. The automatic shift shaft 31 includes a central keyway 31a which extends across the opening 11a formed through the upper portion of the transmission case 11. The automatic shift shaft 31 further includes an upstanding tab 31b which is formed at the rearward end thereof (the right end when viewing FIGS. 2 and 3). The purpose of this upstanding tab 31b will be explained in detail below.

Figure 7:
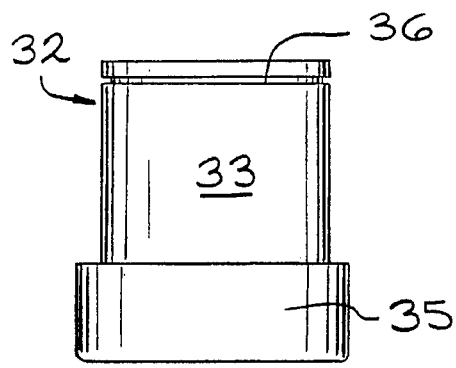
FIG. 7 is a top plan view of the automatic shift member illustrated in FIGS. 1 through 4.
Figure 8:
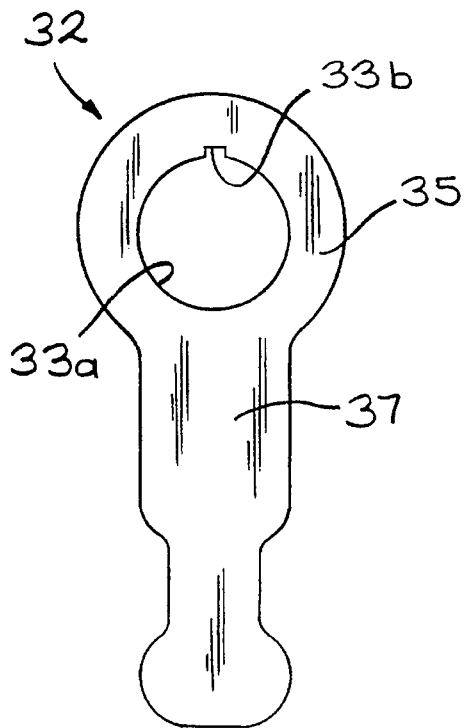
FIG. 8 is a side elevational view of the automatic shift meter illustrated in FIG. 7.

The manual/automatic selector assembly also includes an automatic shift member, indicated generally at 32, which is mounted on the automatic shift shaft 31. As best shown in FIGS. 7 and 8, the automatic shift member 32 includes a central body 33 which is generally hollow and cylindrical in shape. A smooth inner surface 33a of the body 33 has a keyway 33b formed therein which is complementary in size and shape with the central keyway 31a of the automatic shift shaft 31. A key 34 (see FIGS. 1, 2, and 3) is provided in the mating keyways 31a and 33b. Thus, the automatic shift member 32 is supported on the automatic shift shaft 31 for sliding axial movement relative thereto (left and right when viewing FIGS. 2 and 3), but is restrained by the key 34 for rotational movement therewith.

As also shown in FIGS. 7 and 8, the outer surface of the body 33 of the automatic shift member 32 has an enlarged boss 35 formed at one end thereof. The outer surface of the body 33 also has a circumferential groove 36 formed about the other end thereof. Lastly, the automatic shift member 32 is formed having a finger 37 which extends downwardly from the body 33 thereof. The depending finger 37 of the automatic shift member 32 is aligned with the rearward notches 20b, 21b, 22b, and 30b respectively formed in the rails 20, 21, 22, and 30. The purposes of the boss 35, the groove 36, and the finger 37 will be explained in detail below.

Figure 9:
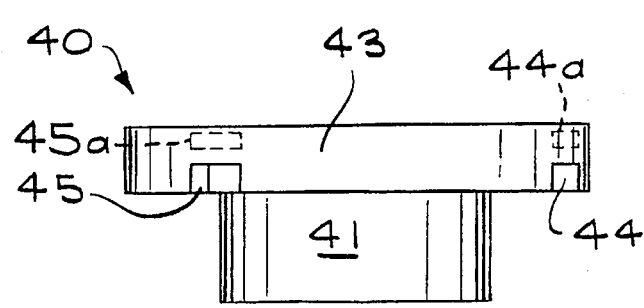
FIG. 9 is a top plan view of the manual shift member illustrated in FIGS. 1 through 4.
Figure 10:
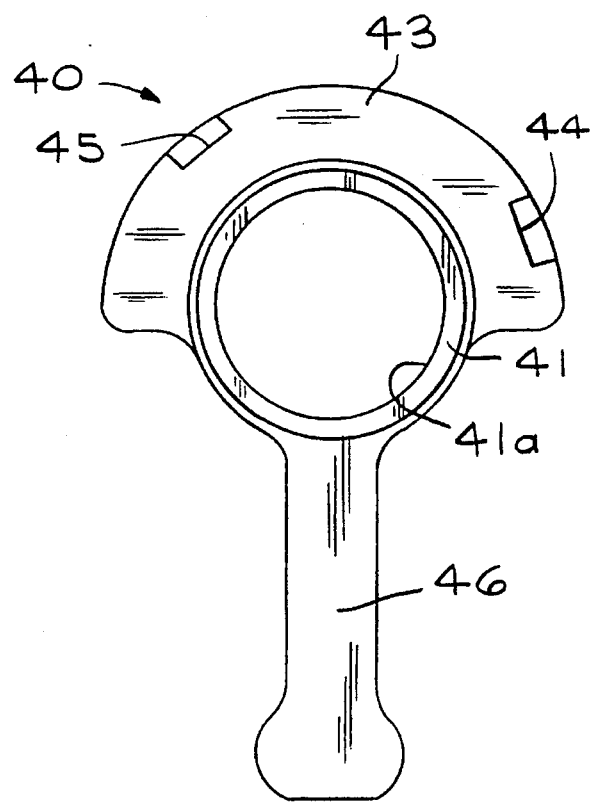
FIG. 10 is a side elevational view of the manual shift member illustrated in FIG. 9.

The manual/automatic selector assembly further includes a manual shift member, indicated generally at 40, which is supported on the automatic shift member 32. As best shown in FIGS. 9 and 10, the manual shift member 40 includes a central body 41 which is generally hollow and cylindrical in shape. A smooth inner surface 41a of the body 41 is sized to be slightly larger in diameter than the outer diameter of the body 33 of the automatic shift member 32. Thus, the body 41 of the manual shift member 40 is journalled on the body 33 of the automatic shift member 32 for rotational movement relative thereto, as shown in FIGS. 2, 3, and 4. When so installed, the body 41 of the manual shift member 40 abuts the enlarged boss 35 formed on the body 33 of the automatic shift member 32. To retain the manual shift member 40 on the automatic shift member 32, a snap ring 42 is provided in the groove 36 of the body 33. Thus, it can be seen that the combined assembly of the automatic shift member 32 and the manual shift member 40 is axially slidable as a unit along the automatic shift shaft 31. However, the manual shift member 40 can be rotated relative to the automatic shift member 32 and the automatic shift shaft 31 keyed thereto.

As also shown in FIGS. 9 and 10, the outer surface of the body 41 of the manual shift member 40 is formed having an enlarged circumferential flange 43 at one end thereof. First and second recesses 44 and 45 are formed in the outer surface of the flange 43. As best shown in FIG. 9, the recesses 44 and 45 extend only partially across the outer surface of the flange 43. Thus, a non-recessed portion of the outer surface of the flange 43 is provided directly adjacent to each of the recesses 44 and 45. These non-recessed portions are indicated in dotted lines at 44a and 45a in FIG. 9. The manual shift member 40 is further formed having a finger 46 which depends downwardly from the body 41 thereof. Similar to the depending finger 37 of the automatic shift member 32, the depending finger 46 of the manual shift member 40 is aligned with the rearward notches 20b, 21b, 22b, and 30b respectively formed in the rails 20, 21, 22, and 30. The purposes of the flange 43, the recesses 44 and 45, the non-recessed surfaces 44a and 45a, and the finger 46 will be explained in greater detail below.

Referring now to FIGS. 2 and 3, it can be seen that the combined assembly of the automatic shift member 32 and the manual shift member 40 is axially slidable along the automatic shift shaft 31 between a first position (illustrated in FIG. 2) and a second position (illustrated in FIG. 3). In the first position illustrated in FIG. 2, the combined assembly of the automatic shift member 32 and the manual shift member 40 is positioned for manual shifting of the third shift rail 22. In the second position illustrated in FIG. 3, the combined assembly of the automatic shift member 32 and the manual shift member 40 is positioned for automatic shifting of the third shift rail 22.

In the manual shifting position illustrated in FIG. 2, the depending finger 37 of the automatic shift member 32 is located out of all of the rearward notches 20b, 21b, 22b, and 30b formed in the rails 20, 21, 22, and 30, respectively. Thus, rotational movement of the automatic shift member 32 and the automatic shift shaft 31 (in a manner described below) will have no effect on any of the components of the transmission 10. At the same time, however, the depending finger 46 of the manual shift member 40 is disposed within both the rearward notch 22b formed in the third shift rail 22 and the rearward notch 30b formed in the idler rail 30. Thus, in this position, the finger 46 of the manual shift member 40 functions as a key to connect the third shift rail 22 to the idler rail 30 for movement therewith. Thus, axial movement of the idler rail 30 resulting from manual pivoting movement of the shift lever 14, as described above, will cause corresponding axial movement of the third shift rail 22. Consequently, one or the other of the highest gear ratios available from the third shift rail 22 will be engaged in the manner previously discussed.

In the automatic shifting position illustrated in FIG. 3, the depending finger 37 of the automatic shift member 32 is located only within the notch 22b formed in the third shift rail 22. Thus, rotational movement of the automatic shift member 32 and the automatic shift shaft 31 (in a manner described below) will cause axial movement of the third shift rail 22. As a result, one or the other of the highest gear ratios available from the third shift rail 22 will be engaged in the manner previously discussed. At the same time, however, the depending finger 46 of the manual shift member 40 is disposed only within the notch 30b formed in the idler rail 30. As mentioned above, the manual shift member 40 is supported on the automatic shift member 32 for relative rotational movement. Thus, when the third shift rail 22 is moved automatically as described above, the automatic shift member 32 is rotated relative to the manual shift member 40. Consequently, the idler rail 30 is not moved with the third shift rail 22, but rather remains stationary. The importance of this disconnection of the idler rail 30 from the third shift rail 22 when the transmission 10 is operated in the automatic mode will be explained below.

Means are provided for selectively moving the combined assembly of the automatic shift member 32 and the manual shift member 40 between the first and second positions discussed above to select operation in either the manual or automatic shifting modes. As best shown in FIGS. 2 and 3, this means for selectively moving includes a pair of mode selecting pistons 50 and 51 which are slidably disposed in respective chambers 52 and 53 defined in the shift housing 12. The mode selecting pistons 50 and 51 have respective generally cylindrical recesses 50a and 51a formed therein which face one another. A pin 54 is disposed between the two mode selecting pistons 50 and 51, extending within and supported by the corresponding recesses 50a and 51a. Also, a portion of the flange 43 of the manual shift member 40 is captured between flange portions of the two mode selecting pistons 50 and 51. Thus, by moving the mode selecting pistons 50 and 51 within their respective chambers 52 and 53, the combined assembly of the automatic shift member 32 and the manual shift member 40 can be moved between the first and second positions.

A simplified schematic diagram of a fluid actuated control circuit is illustrated in FIGS. 2 and 3 for causing movement of the combined assembly of the automatic shift member 32 and the manual shift member 40 between the first and second positions. The fluid control circuit includes a first port 55 formed in the chamber 52 and a second port 56 formed in the chamber 53. The first port 55 communicates through a conduit 55a to a first outlet of a conventional two-way, two-position valve 57. The second port 56 communicates through a conduit 56a to a second outlet of the valve 57. A first inlet of the valve 57 is connected to a source of pressurized air 58. A second inlet of the valve 57 is vented to the atmosphere. Alternatively, the first inlet of the valve 57 may be connected to a source of pressurized hydraulic fluid, in which case the second inlet of the valve 57 would be vented to a reservoir.

In either event, the valve 57 is manually movable by the driver of the vehicle between a first position illustrated in FIG. 2 and a second position illustrated in FIG. 3. In the first position, pressurized air is supplied to the right chamber 53, while the left chamber 52 is vented to the atmosphere. As a result, the mode selecting piston 51 urges the pin 54, the mode selecting piston 50, and the combined assembly of the automatic shift member 32 and the manual shift member 40 toward the left into the first position illustrated in FIG. 2 for operation in the manual shifting mode. To change to the automatic shifting mode, the driver moves the valve 57 to the second position illustrated in FIG. 3. When so moved, pressurized air is supplied to the left chamber 52, while the right chamber 53 is vented to the atmosphere. As a result, the mode selecting piston 50 urges the pin 54, the mode selecting piston 51, and the combined assembly of the automatic shift member 32 and the manual shift member 40 toward the right into the second position illustrated in FIG. 3 for operation in the automatic shifting mode.

5. Automatic Shifting Assembly

Having described the structure of the manual/automatic selector assembly and how such assembly is moved between the manual shifting position illustrated in FIG. 2 and the automatic shifting position illustrated in FIG. 3, the structure for effecting the automatic shifting of the third shift rail 22 will now be described. To accomplish this, an automatic shifting assembly is provided for selectively rotating the automatic shift shaft 31 when the combined assembly of the automatic shift member 32 and the manual shift member 40 is located in the automatic shifting position illustrated in FIG. 3. This automatic shifting assembly is best illustrated in FIGS. 4, 5, and 6.

As shown therein, the automatic shifting assembly includes a first cylindrical recess, indicated generally at 60, which is formed in the shift housing 12. The first cylindrical recess 60 is closed by a fluid-tight sealing plate 61 secured to the outer surface of the shift housing 12. Within the first cylindrical recess 60, a first automatic shift piston assembly is disposed. The first automatic shift piston assembly includes an outer piston 62, a piston rod 63 having an elongated stem portion, and an inner piston 64. The outer piston 62 is press fit onto the piston rod 63 for movement therewith. The elongated stem portion of the piston rod 63 extends through the inner piston 64 and is axially movable relative thereto. The outer piston 62 sealingly engages the wall of the first cylindrical recess 60 so as to divide it into two fluid-tight chambers 60a and 60b. The chamber 60a is defined between the sealing plate 61 and the outer piston 62, while the chamber 60b is defined between the outer piston 62 and the inner piston 64.

Similarly, a second cylindrical recess, indicated generally at 65, is also formed in the shift housing 12. The second cylindrical recess 65 is closed by a fluid-tight sealing plate 66 secured to the outer surface of the shift housing 12. Within the second cylindrical recess 65, a second automatic shift piston assembly is disposed. The second automatic shift piston assembly includes an outer piston 67, a piston rod 68 having an elongated stem portion, and an inner piston 69. The outer piston 67 is press fit onto the piston rod 68 for movement therewith. The elongated stem portion of the piston rod 68 extends through the inner piston 69 and is axially movable relative thereto. The outer piston 67 sealingly engages the wall of the second cylindrical recess 65 so as to divide it into two fluid-tight chambers 65a and 65b. The chamber 65a is defined between the sealing plate 66 and the outer piston 67, while the chamber 65b is defined between the outer piston 67 and the inner piston 69.

Between the first and second automatic shift piston assemblies, an automatic shift block 70 is provided. The automatic shift block 70 is slidably disposed within an intermediate chamber 71 defined within the shift housing 12 and extending between the cylindrical recesses 60 and 65. The ends of the automatic shift block 70 are formed having first and second recesses 70a and 70b which are sized to receive the innermost ends of the elongated stem portions of the piston rods 62 and 67. The automatic shift block 70 is further formed having a third recess 70c which is sized to receive the upstanding tab 31b of the automatic shift shaft 31 therein. Thus, as best shown in FIGS. 5 and 6, axial sliding movement of the automatic shift block 70 toward the left causes counter-clockwise rotational movement of the automatic shift shaft 31. Similarly, axial sliding movement of the automatic shift block 70 toward the right causes clockwise rotational movement of the automatic shift shaft 31.

A fluid actuated control circuit is illustrated in FIG. 4 for selectively effecting this axial sliding movement of the automatic shift block 70 and, thus, the rotational movement of the automatic shift shaft 31. The fluid control circuit includes a first port 80 which is formed in the chamber 60a defined between the sealing plate 61 and the outer piston 62. The fluid control circuit also includes a second port 81 which is formed in the chamber 65a defined between the sealing plate 66 and the outer piston 67. The fluid control circuit further includes a third port 82 which is located in the chamber 60b defined between the outer piston 62 and the inner piston 64. Lastly, the fluid control circuit includes a fourth port 83 which is located in the chamber 65b defined between the outer piston 67 and the inner piston 69.

The first port 80 communicates through a conduit 80a to a first solenoid operated valve 85. The second port 81 communicates through a conduit 81a to a second solenoid operated valve 86. The third port 82 and the fourth port 83 communicate through a common conduit 82a to a third solenoid operated valve 87. Each of the solenoid operated valves 85, 86, and 87 is connected to a source of pressurized fluid 88, such as pressurized air, through a common inlet line 89. The source of pressurized air 88 may be the same as the source of pressurized air 58 described above. The solenoid operated valves 85, 86, and 87 are conventional in the art and are provided to selectively control the flow of the pressurized air therethrough from the source 88 to each of the ports 80, 81, 82, and 83.

To slide the automatic shift block 70 axially toward the left (resulting in counter-clockwise rotational movement of the automatic shift shaft 31), the second solenoid operated valve 86 is energized to permit pressurized air from the source 88 to enter the chamber 65a through the port 81. At the same time, the first and third solenoid operated valves 85 and 87 are de-energized to respectively vent the chambers 60a, 60b, and 65b from the ports 80, 82, and 83 to the atmosphere. The resultant pressure differential across the outer piston 67 causes it and the piston rod 68 to slide to the left. After a predetermined amount of free sliding, the inner end of the piston rod 68 received in the second recess 70b engages the automatic shift block 70, sliding it to the left as shown in FIG. 6. Consequently, the automatic shift shaft 31 is rotated in the counter-clockwise direction.

To slide the automatic shift block 70 axially toward the right (resulting in clockwise rotational movement of the automatic shift shaft 31), the first solenoid operated valve 85 is energized to permit pressurized air from the source 88 to enter the chamber 60a through the port 80. At the same time, the second and third solenoid operated valves 86 and 87 are de-energized to respectively vent the chambers 65a, 60b, and 65b from the ports 81, 82, and 83 to the atmosphere. The resultant pressure differential across the outer piston 62 causes it and the piston rod 63 to slide to the right. After a predetermined amount of free sliding, the inner end of the piston rod 63 received in the first recess 70a engages the automatic shift block 70, sliding it to the right. Consequently, the automatic shift shaft 31 is rotated in the clockwise direction.

To position the automatic shift block 70 in the central neutral position illustrated in FIGS. 4 and 5, the third solenoid operated valve 87 is energized to permit pressurized air from the source 88 to enter the chambers 60b and 65b through the ports 82 and 83. At the same time, the first and second solenoid operated valves 85 and 86 are de-energized to respectively vent the chambers 60a and 65a from the ports 80 and 81 to the atmosphere. The resultant pressure differentials cause the outer and inner pistons 62 and 64 to slide apart from one another within the first cylindrical recess 60, and further cause the outer and inner pistons 67 and 69 to slide apart from one another within the second cylindrical recess 65. Thus, the inner pistons 64 and 69 are moved inwardly toward one another and engage the ends of the automatic shift block 70. As a result, the automatic shift block 70 is positioned in the neutral position illustrated in FIGS. 4 and 5, and the automatic shift shaft 31 is rotated to the neutral position as well.

6. Automatic Shift Position Sensor

To facilitate the operation of the transmission 10, it is desirable that the automatic shifting assembly described above be operated only when the highest gear ratios are selected by the driver of the vehicle. If the transmission 10 is a single stage, five speed transmission, the highest gear ratios are fourth and fifth. If the transmission 10 is a compound, ten speed transmission, the highest gear ratios are ninth and tenth. In either embodiment, means are provided for generating an electrical signal when the highest gear ratios are selected by the driver of the vehicle.

Figure 11:
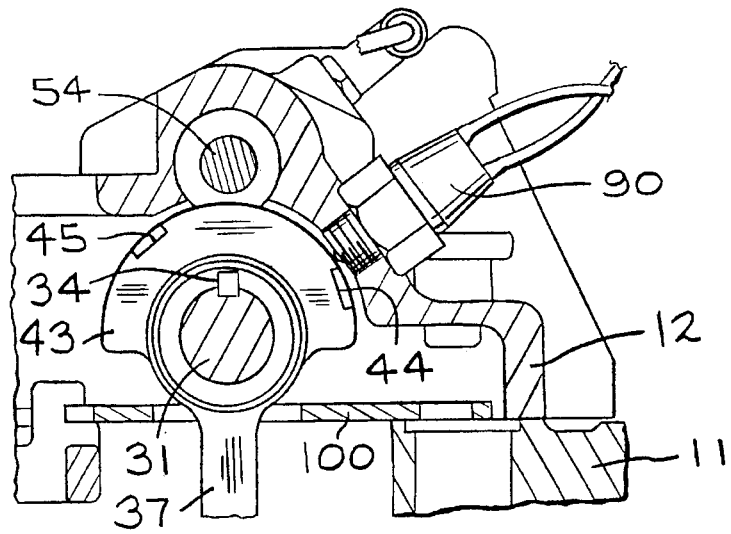
FIG. 11 is an enlarged side sectional view of the automatic shift position sensor illustrated in FIG. 2, wherein the manual shift finger is shown in a neutral position.
Figure 12:
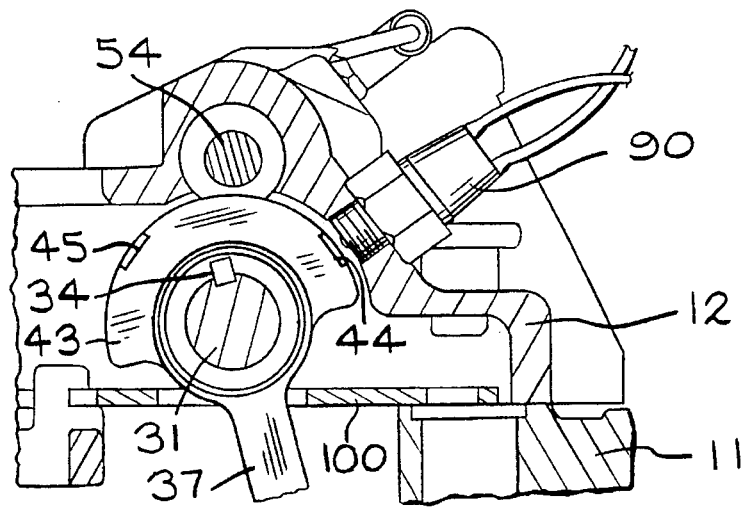
FIG. 12 is an enlarged side sectional view of the automatic shift position sensor illustrated in FIG. 11, wherein the manual shift finger is shown in a gear engaging position, and wherein the combined assembly of the automatic shift member and the manual shift member are located in the first position illustrated in FIG. 2 for manual operation.
Figure 13:
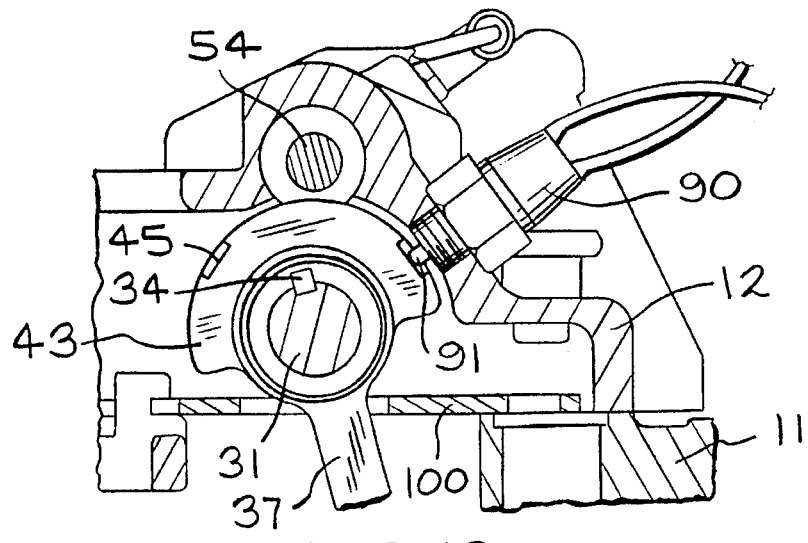
FIG. 13 is an enlarged side sectional view of the automatic shift position sensor illustrated in FIG. 11, wherein the manual shift finger is shown in a gear engaging position, and wherein the combined assembly of the automatic shift member and the manual shift member are located in the second position illustrated in FIG. 3 for automatic operation.

This means for generating an electrical signal includes an automatic shift position sensor 90 which, as best shown in FIGS. 11 through 13, is mounted in the shift housing 12. The automatic shift position sensor 90 is conventional in the art and is designed to generate an electrical signal whenever the manual shift finger 40 is rotated out of the neutral position to a gear engaging position. To accomplish this, the illustrated automatic shift position sensor 90 is provided with an internal movable ball 91. The ball 91 is urged outwardly from the automatic shift position sensor 90 into engagement with the outer surface of the flange 43 formed on the manual shift member 40.

When the idler rail 30 and the manual shift member 40 are in the neutral position illustrated in FIG. 11, the recesses 44 and 45 formed in the outer surface of the flange 43 are not aligned with the automatic shift position sensor 90. Because it is urged into engagement with the outer surface of the flange 43, the ball 91 is located in a first retracted position relative to the automatic shift position sensor 90. Means provided within the automatic shift position sensor 90 are responsive to this retracted position of the ball 91 for generating a first electrical output signal.

When the idler rail 30 and the manual shift member 40 are moved out of the neutral position into one of the gear engaging positions, two outcomes are possible. The first outcome, illustrated in FIG. 12, occurs when the driver of the vehicle desires manual operation of the highest gear ratios of the transmission 10. As discussed above, the combined assembly of the automatic shift member 32 and the manual shift member 40 is located in the first position illustrated in FIG. 2 for such manual operation. If the manual shift member 40 is located in this position when the idler rail 30 is moved out of the neutral position, then the non-recessed outer surface 44a of the flange 43 (located adjacent to the recess 44) becomes aligned with the automatic shift position sensor 90. As a result, the ball 91 is maintained in its first retracted position. Thus, the automatic shift position sensor 90 continues to generate the first electrical output signal.

The second outcome, illustrated in FIG. 13, occurs when the driver of the vehicle desires automatic operation of the highest gear ratios of the transmission 10. As discussed above, the combined assembly of the automatic shift member 32 and the manual shift member 40 is located in the second position illustrated in FIG. 3 for such automatic operation. If the manual shift member 40 is located in this position when the idler rail 30 is moved out of the neutral position, then the recess 44 formed in the outer surface of the flange 43 becomes aligned with the automatic shift position sensor 90. As a result, the ball 91 is urged outwardly into the recess 44 and is located in a second extended position relative to the automatic shift position sensor 90. Means provided within the automatic shift position sensor 90 are responsive to this extended position of the ball 91 for generating a second electrical output signal.

Thus, it can be seen that the second electrical output signal will be generated by the automatic shift position sensor 90 only when both (1) the idler rail 30 and the manual shift member 40 are moved out of the neutral position to a gear engaging position and (2) the combined assembly of the automatic shift member 32 and the manual shift member 40 is located in the second position illustrated in FIG. 3 for automatic operation. If either of these conditions is not satisfied, the ball 91 contained in the automatic shift position sensor 90 will not be received within the recess 44, and the automatic shift position sensor 90 will generate the first electrical output signal. The manner in which these first and second electrical output signals are used to control the operation of the automatic shifting assembly will be explained below.

7. Shifting Operation—Single Stage Transmission

The operation of the transmission 10 thus far described will now be explained in the context of the single stage, five speed transmission discussed above. To operate the transmission 10 manually, the driver of the vehicle initially moves the valve 57 to the first position illustrated in FIG. 2. As discussed above, pressurized air supplied to the chamber 53 causes the combined assembly of the automatic shift member 32 and the manual shift member 40 to slide along the automatic shift shaft 31 toward the left to the manual shifting position illustrated in FIG. 2. As a result, the depending finger 37 of the automatic shift member 32 is located out of the notch 22*b* formed in the third shift rail 22. At the same time, the depending finger 46 of the manual shift member 40 is disposed within both the notch 22*b* formed in the third shift rail 22 and the notch 30*b* formed in the idler rail 30. Accordingly, the third shift rail 22 is connected to the idler rail 30 for movement therewith, as described above.

To manually shift among the reverse and first gear ratios, the driver initially moves the lower end of the shift lever 14 transversely to select the first shift rail 20. Then, the driver moves the lower end of the shift lever 14 longitudinally to move the first shift rail 20 into one of its two gear engaging positions. Similarly, to manually shift among the second and third gear ratios, the driver initially moves the lower end of the shift lever 14 transversely to select the second shift rail 21. Then, the driver moves the lower end of the shift lever 14 longitudinally to move the second shift rail 21 into one of its two gear engaging positions.

To manually shift among the fourth and fifth gear ratios, the driver initially moves the lower end of the shift lever 14 transversely to select the idler rail 30, not the third shift rail 22. Subsequently, the driver moves the lower end of the shift lever 14 longitudinally to move the idler rail 30 into one of its two gear engaging positions. Because of the key-like engagement of the depending finger 46 of the manual shift member 40 with both the idler rail 30 and the third shift rail 22, such longitudinal movement of the idler rail 30 causes corresponding longitudinal movement of the third shift rail 22 into one of its two gear engaging positions. As previously discussed, the depending finger 37 of the automatic shift member 32 is located out of the notch 22*b* formed in the third shift rail 22 and, thus, has no effect on the operation of the transmission 10 during manual shifting. Throughout this entire process, the automatic shift position sensor 90 generates the first electrical output signal, as described above.

To operate the transmission 10 automatically, the driver of the vehicle initially moves the valve 57 to the second position illustrated in FIG. 3. As discussed above, pressurized air supplied to the chamber 52 causes the combined assembly of the automatic shift member 32 and the manual shift member 40 to slide along the automatic shift shaft 31 toward the right to the automatic shifting position illustrated in FIG. 2. As a result, the depending finger 37 of the automatic shift member 32 is located within the notch 22*b* formed in the third shift rail 22, while the depending finger 47 of the manual shift member 40 is located within the notch 30*b* formed in the idler rail 30.

To manually shift among the reverse and first gear ratios and among the second and third gear ratios, the driver follows the procedure discussed above. However, to automatically shift among the fourth and fifth gear ratios, the driver need only move the lower end of the shift lever 14 transversely to select the idler rail 30, then pivot the shift lever 14 to move the manual shift member 40 to the gear engaging position illustrated in FIG. 13. When this occurs, the automatic shift position sensor 90 generates the second electrical signal, as discussed above. In response thereto, the automatic shifting assembly described above is operated to selectively cause clockwise and counter-clockwise rotational movement of the automatic shift shaft 31. As discussed above, the depending finger 37 of the automatic shift member 32 (which is keyed to the automatic shift shaft 31 for rotational movement therewith) is located within the notch 22*b* formed in the third shift rail 22. Consequently, clockwise and counter-clockwise rotation of the automatic shift shaft 31 causes corresponding forward and rearward longitudinal movement of the third shift rail 22 into its two gear engaging positions.

While this automatic shifting of the highest two gear ratios is occurring, it will be recalled that the depending finger 46 of the manual shift member 40 is disposed only within the notch 30*b* formed in the idler rail 30. Thus, the idler rail 30 is effectively disconnected from the third shift rail 22. As a result, when the third shift rail 22 is shifted automatically as described above, the idler rail 30 and the manual shift member 40 remain stationary. This is desirable because if the idler rail 30 remained connected to the third shift rail 22, then the upper portion of the shift lever 14 would pivot back and forth as the third shift rail 22 is automatically shifted. Such movement of the shift lever 14 would constitute an undesirable distraction and annoyance to the driver of the vehicle. Thus, the structure of this invention allows the shift lever 14 to remain stationary even though the third shift rail 22 is automatically shifted.

8. Shifting Operation—Compound Transmission

Figure 14:
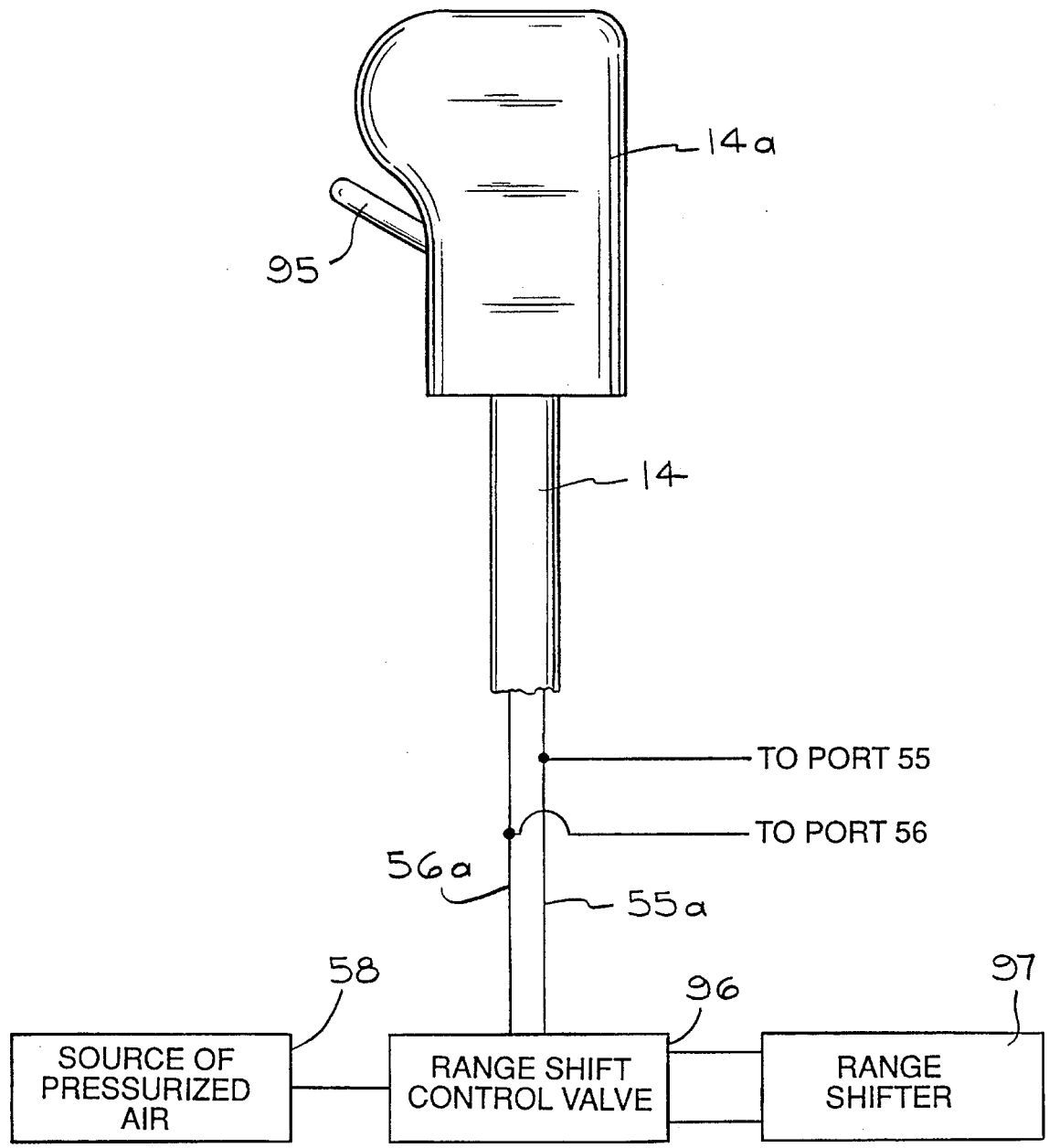
FIG. 14 is a simplified schematic diagram of a fluid control system for use with the compound transmission embodiment of this invention.

The operation of the transmission 10 thus far described will now be explained in the context of the compound, ten speed transmission discussed above. FIG. 14 illustrates a schematic diagram of a fluid control system for use with such a compound transmission. As shown therein, the shift lever 14 is provided with a handle 14*a* upon which a range select switch 95 is mounted. The range select switch is conventional in the art and is connected to a pilot control valve (not shown) contained within the handle of the shift lever 14. The pilot control valve may be embodied as the two-way, two-position valve 57 described above. Thus, manual operation of the range select switch 95 causes movement of the valve 57 as described above.

In the illustrated embodiment, the conduits 55a and 55b are connected not only to the valve 57 as described above, but also are connected to a range shift control valve 96. The range shift control valve 96 is conventional in the art and is provided to control the operation of a conventional range shifter 97. When the valve 57 is moved to the first position illustrated in FIG. 2, pressurized air is supplied through the conduit 56a not only to the chamber 53 as described above, but also to one side of the range shift control valve 96. In response thereto, the range shift control valve 96 is moved to a first position, which causes the range shifter 97 to place the auxiliary section of the transmission 10 in the low gear ratio range. When the valve 57 is moved to the second position illustrated in FIG. 3, pressurized air is supplied through the conduit 55a not only to the chamber 52 as described above, but also to the other side of the range shift control valve 96. In response thereto, the range shift control valve 96 is moved to a second position, which causes the range shifter 97 to place the auxiliary section of the transmission 10 in the high gear ratio range.

To operate the compound transmission 10, the driver of the vehicle initially moves the valve 57 to the first position illustrated in FIG. 2. As discussed above, pressurized air supplied to the chamber 53 causes the combined assembly of the automatic shift member 32 and the manual shift member 40 to slide along the automatic shift shaft 31 toward the left to the manual shifting position illustrated in FIG. 2. As a result, the depending finger 37 of the automatic shift member 32 is located out of the notch 22b formed in the third shift rail 22. At the same time, the depending finger 46 of the manual shift member 40 is disposed within both the notch 22b formed in the third shift rail 22 and the notch 30b formed in the idler rail 30. Accordingly, the third shift rail 22 is connected to the idler rail 30 for movement therewith, as described above. Also, the auxiliary section of the transmission 10 is placed in the low gear ratio range, as described above.

To manually shift among the reverse and first gear ratios, the second and third gear ratios, and the fourth and fifth gear ratios, the driver follows the procedure discussed above with respect to the single-stage transmission. It will be appreciated that even when the fourth and fifth gear ratios are selected, the automatic shift position sensor 90 continues to generate the first electrical output signal, as discussed above. While still in the fifth gear ratio, but in anticipation of shifting into the sixth gear ratio, the driver moves the valve 57 from the first position to the second position. This has the effect of preparing the range shifter to change from the low gear ratio range to the high gear ratio range as soon as the idler rail 30 is returned to the neutral position. This also has the effect of preparing the manual/automatic shifting assembly to move the combined assembly of the automatic shift member 32 and the manual shift member 40 from the first position illustrated in FIG. 2 to the second position illustrated in FIG. 3 as soon as the idler rail 30 is returned to the neutral position.

To manually shift to the sixth gear ratio, the driver initially moves the lower end of the shift lever 14 transversely to select the first shift rail 20. Then, the driver moves the lower end of the shift lever 14 longitudinally to move the first shift rail 20 into its gear engaging position. Similarly, to manually shift among the seventh and eighth gear ratios, the driver initially moves the lower end of the shift lever 14 transversely to select the second shift rail 21. Then, the driver moves the lower end of the shift lever 14 longitudinally to move the second shift rail 21 into one of its two gear engaging positions.

To shift among the ninth and tenth gear ratios, the driver initially moves the lower end of the shift lever 14 transversely to select the idler rail 30, then pivots the shift lever 14 to move the manual shift member 40 to the gear engaging position illustrated in FIG. 13. When this occurs, the automatic shift position sensor 90 generates the second electrical output signal, as described above. Subsequently, the automatic shift shaft 31 (and the automatic shift member 32 keyed thereto) is automatically rotated by the automatic shifting assembly to move the third shift rail 22 into one of its two gear engaging positions. Thus, shifting among the ninth and tenth gear ratios is performed automatically when the manual shift member 40 is moved to the gear engaging position, as described above.

Because the valve 57 controls both the operation of the manual/automatic shifting assembly and the range shifter 97, the above described structure always provides for automatic shifting between the ninth and tenth gear ratios when the manual shift member 40 is moved to the gear engaging position by the driver, as described above. In some instances, however, it may be desirable to override such automatic shifting to permit manual shifting between the ninth and tenth gear ratios. This can be achieved by providing separate valves for individually controlling the operations of the manual/automatic shifting assembly and the range shifter 97. Alternatively, an override valve (not shown) can be placed in the conduits 55a and 56a between the valve 57 and the manual/automatic shifting assembly to prevent the combined assembly of the automatic shift member 32 and the manual shift member 40 from moving out of the first position illustrated in FIG. 2 when the valve 57 is moved to the second position. Lastly, a disable switch (not shown) may be connected to the output of the automatic shift position sensor 90 to prevent the second electrical output signal from being transmitted therefrom.

9. Shift Lever Restraining Plate

As discussed above, the lower end of the shift lever 14 cooperates with the forward notches 20a, 21a, 22a, and 30a of the respective rails 20, 21, 22, and 30. As also discussed above, such forward notches 20a, 21a, 22a, and 30a are aligned with one another in a direction which is transverse to the longitudinal axes of the rails 20, 21, 22, and 30 when such rails 20, 21, 22, and 30 are all in their neutral positions. Because of such alignment, there is no positive stop provided on the rails 20, 21, 22, and 30 for limiting the transverse movement of the lower end of the shift lever 14 during the selecting process.

To address this, a shift lever restraining plate 100 is provided on the transmission 10. As best shown in FIG. 1, the shift lever restraining plate 100 is disposed on the upper portion of the transmission case 11 about the opening 11a. Any conventional means, such as bolts (not shown), may be used to secure the shift lever restraining plate 100 to the case 11.

Figure 15:
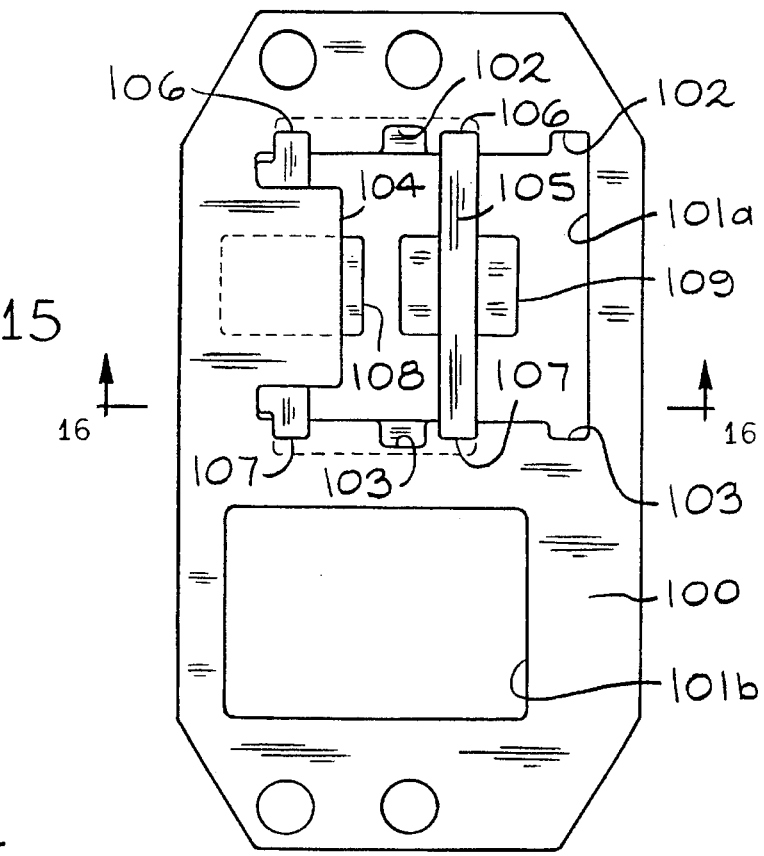
FIG. 15 is a top plan view of the shift lever restraining plate and interlock bracket illustrated in FIG. 1.

The structure of the shift lever restraining plate 100 is best illustrated in FIG. 15. As shown therein, the shift lever restraining plate 100 has a front opening 101a and a rear opening 101b formed therethrough, both of which are generally rectangular in shape. The front opening 101a is provided to accommodate the lower end of the shift lever 14, which extends therethrough into cooperation with the forward notches 20a, 21, 22a, and 30a. The rear opening 101b is provided to accommodate the depending fingers 37 and 46 of the automatic shift member 32 and the manual shift member 40, respectively, which extend therethrough into cooperation with the rearward notches 20b, 2b, 22b, and 30b. A first pair of slots 102 are formed in the front edge of the opening 101, and a second pair of slots 103 are formed in the rear edge of the opening 101. Also, an inwardly extending boss 104 is formed on one side edge of the opening 101.

An interlock bracket 105 is mounted on the shift lever restraining plate 100 for sliding movement relative thereto. The interlock bracket 105 includes a first pair of tabs 106 which extend over the front edge of the opening 101 and a second pair of tabs 107 which extend over the rear edge of the opening 101. The tabs 106 and 107 support the interlock bracket 105 on the shift lever restraining plate 100 for sliding movement to the left and right when viewing FIG. 15. The slots 102 and 103 receive the tabs 106 and 107 when the interlock bracket 105 is initially installed on the shift lever restraining plate 100 from below.

Figure 16:
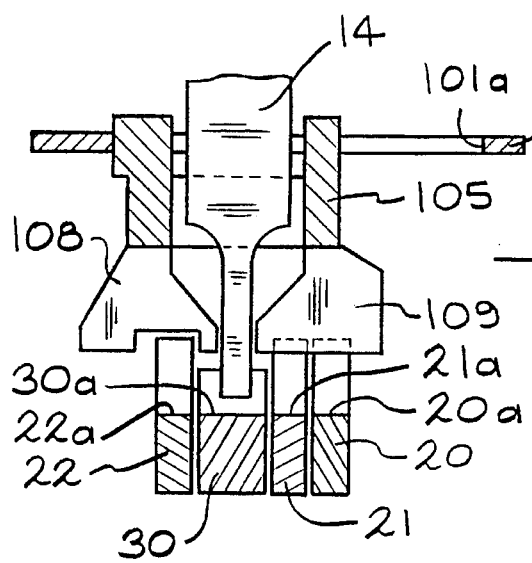
FIG. 16 is a sectional elevational view taken along line 16—16 of FIG. 15 showing the shift lever restraining plate and interlock bracket, together with a portion of the shift lever in engagement with the idler rail.
Figure 17:
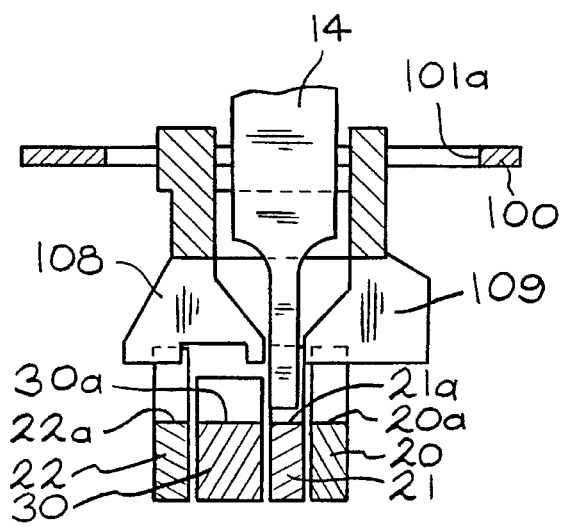
FIG. 17 is a sectional elevational view similar to FIG. 16 showing the shift lever restraining plate and interlock bracket, together with a portion of the shift lever in engagement with the second shift rail.

As best shown in FIGS. 16 and 17, the interlock bracket 105 further includes a pair of downwardly extending legs 108 and 109. The legs 108 and 109 are adapted to receive the lower end of the shift lever 14 therebetween as it extends downwardly through the front opening 101a. As a result, the interlock bracket 105 slides left and right with the lower end of the shift lever 14 when the shift lever 14 is moved by the driver in a direction which is transverse to the longitudinal axes of the rails 20, 21, 22, and 30. When the lower end of the shift lever 14 is moved into the forward notch 30a of the idler rail 30, as shown in FIG. 16, the legs 108 and 109 of the interlock bracket 105 extend into the notches 20a and 21a of the first and second shift rails 20 and 21. Thus, the first and second shift rails 20 and 21 are prevented from moving out of their neutral positions. Similarly, when the lower end of the shift lever 14 is moved into the forward notch 21a of the second shift rail 21, as shown in FIG. 17, the legs 108 and 109 of the interlock bracket 105 extend into the notches 30a and 20a of the idler rail 30 and the first shift rail 20. Thus, the idler rail 30 and the first shift rail 20 are prevented from moving out of their neutral positions. The idler rail 30 and the second shift rail 21 are prevented from moving out of their neutral positions when the lower end of the shift lever 14 is moved into the forward notch 20a of the first shift rail 20.

As shown in FIGS. 15 and 16, the interlock bracket 105 engages the boss 104 formed on the side edge of the shift lever restraining plate 100 when the lower end of the shift lever 14 is moved into the forward notch 30a of the idler rail 30. This engagement provides a positive stop for the shift lever 14, preventing further movement thereof toward the left. Thus, the shift lever restraining plate 100 and the interlock bracket 105 function to limit the transverse movement of the lower end of the shift lever 14 during the selecting process.

10. Automatic Shift Rail Position Sensing

Figure 18:
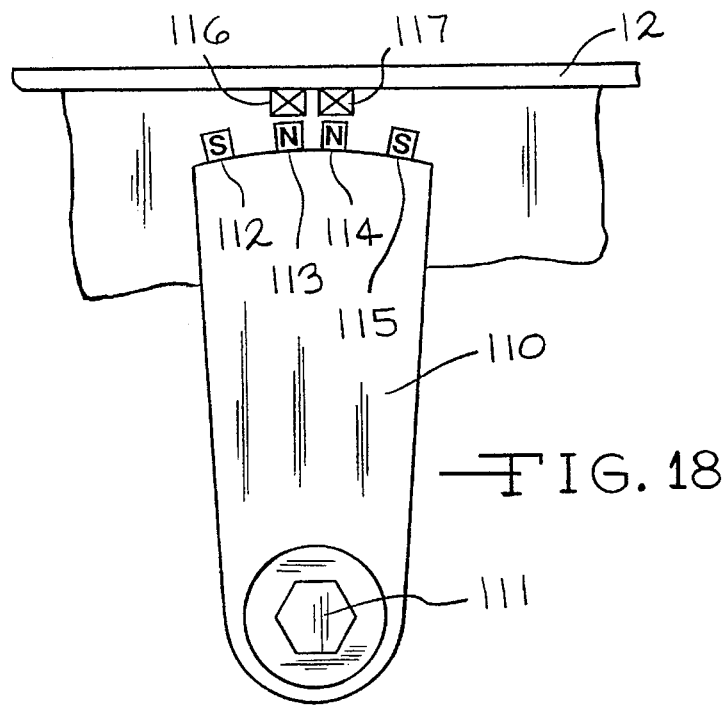
FIG. 18 is a fragmentary side sectional view taken along line 18—18 of FIG. 2 showing the means for sensing the rotational position of the automatic shift shaft.

To best control the automatic shifting process, it is desirable to generate an electrical signal which is representative of the actual position of the third shift rail 22. To accomplish this, means are provided in the transmission 10 for sensing the rotational position of the automatic shift shaft 31. As shown in FIGS. 2, 3, and 18, this means for sensing includes a sensor bracket 110 which is secured to the end of the automatic shift shaft 31 by a threaded fastener 111. Thus, rotational movement of the automatic shift shaft 31 causes pivoting movement of the sensor bracket 110. The sensor bracket 110 is generally L-shaped in cross section, having a plurality of permanent magnets 112, 113, 114, and 115 mounted thereon. The magnets 112, 113, 114, and 115 are positioned on the sensor bracket 110 such that when the automatic shift shaft 31 is rotated, the magnets 112, 113, 114, and 115 are moved in an arc-like manner past a pair of sensors 116 and 117 mounted on the case 11 of the transmission 10.

Preferably, the magnets 112, 113, 114, and 115 are arranged such that outermost magnets 112 and 115 present one pole (the south pole, for example) toward the sensors 116 and 117, while the innermost magnets 113 and 114 present the opposite pole (the north pole, for example) toward the sensors 116 and 117. When the magnets 112, 113, 114, and 115 are moved past the sensor 116, the sensors 116 and 117 generate electrical signals. For example, assume that the sensors 116 and 117 generate a logical low or "0" output signal when the south pole magnets 112 or 115 are moved adjacent thereto and generate a logical high or "1" output signal when the north pole magnets 113 or 114 are moved adjacent thereto.

When the automatic shift shaft 31 is in the neutral position illustrated in FIG. 18, the north pole magnets 113 and 114 are respectively located adjacent to the sensors 116 and 117. Thus, both sensors 116 and 117 generate a logical high or "1" output signal. This logical "1—1" output signal can be used to indicate that the automatic shift shaft 31 is in the neutral position. When the automatic shift shaft 31 is rotated clockwise as previously discussed, the south pole magnet 112 is moved adjacent to the sensor 116, while the north pole magnet 113 is moved past the sensor 117. Thus, the sensor 116 generates a logical low or "0" output signal, while the sensor 117 generates a logical high or "1" output signal. This logical "0-1" output signal can be used to indicate that the automatic shift shaft 31 is in a first gear engaging position. Similarly, when the automatic shift shaft 31 is rotated counter-clockwise as previously discussed, the north pole magnet 114 is moved past the sensor 116, while the south pole magnet 115 is moved adjacent to the sensor 117. Thus, the sensor 116 generates a logical high or "1" output signal, while the sensor 117 generates a logical low or "0" output signal. This logical "1-0" output signal can be used to indicate that the automatic shift shaft 31 is in a second gear engaging position.

Although any conventional sensors which are responsive to movement of the magnets 112, 113, 114, and 115 may be used, the sensors 116 and 117 are preferably embodied as Hall effect latch sensors. Such Hall effect latch sensors 116 and 117 not only generate predetermined output signals depending upon the particular pole of the magnet presented to it, but further latch into that condition and hold it until an opposite pole magnet is moved adjacent thereto. Thus, when the automatic shift shaft 31 is rotated from the neutral position to one of the gear engaging positions, the sensors 116 and 117 will continue to generate the logical "1—1" output signal until one of the south pole magnets 112 or 115 is moved adjacent thereto. Thus, it is insured that the shifting process is fully completed before the sensors generate the logical "1-0" or "0-1" output signal. For example, the Hall effect latch sensors may be embodied as Type UGN-3035U sensors from Sprague Electric Company.

11. Electronic Control

Figure 19:
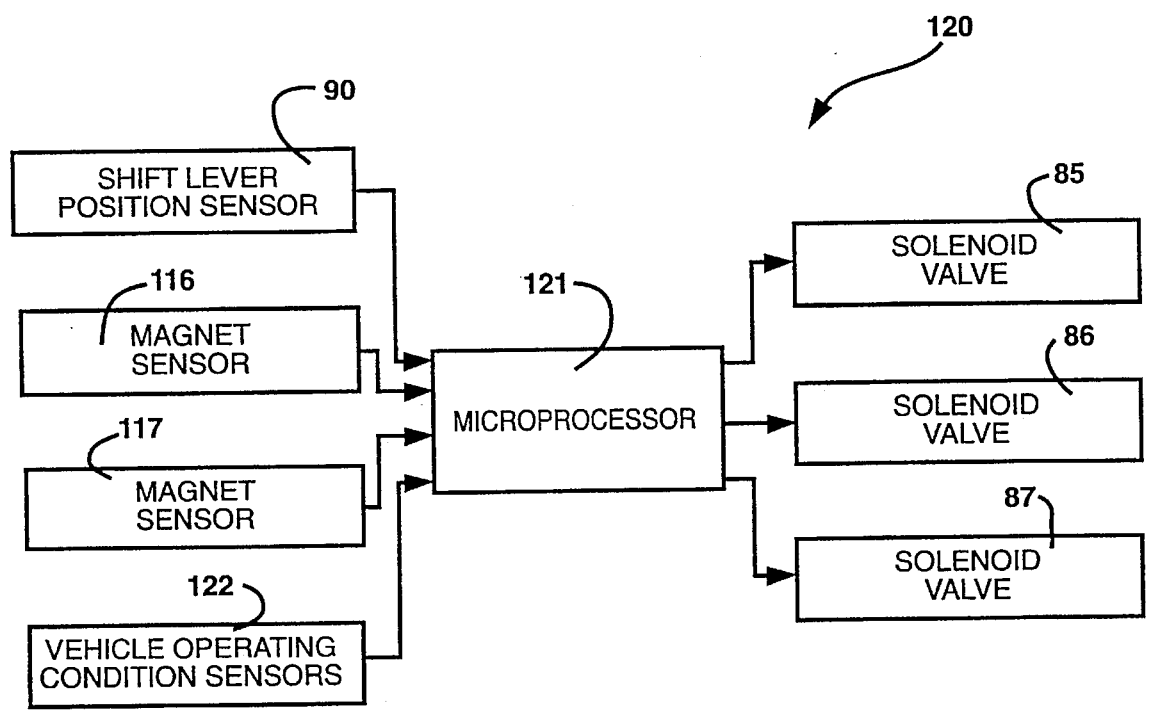
FIG. 19 is a simplified schematic diagram of an electronic control circuit for use with the transmission of this invention.

Referring now to FIG. 19, there is illustrated a simplified schematic diagram of an electronic control circuit, indicated generally at 120, for use with the above-described transmission 10. The electronic control circuit 120 includes a microprocessor 121 or similar electronic controller which can be programmed to generate one or more electrical output signals in response to a plurality of electrical input signals. A first input signal to the microprocessor 121 is provided from the automatic shift position sensor 90, which is representative of whether manual or automatic shifting is to be performed. Second and third input signals are provided from the sensors 116 and 117, which are representative of the rotational position of the automatic shift shaft 31 and, therefore, the axial position of the idler rail 30. Lastly, additional input signals may be provided from one or more vehicle operating parameter sensors 122 located within the vehicle. Such vehicle operating parameters may include engine speed, road speed, throttle position, brake actuation, and the like.

The microprocessor 121 performs a pre-programmed routine to analyze the various input signals supplied thereto to generate appropriate output signals to the solenoid operated valves 85, 86, and 87. In response thereto, the solenoid operated valves 85, 86, and 87 are operated as described above to automatically shift the third shift rail 22. Any pre-programmed routine may be employed to accomplish this, and a person having ordinary skill in the art would be able to construct an operable routine. The pre-programmed routine itself forms no part of this invention.

12. Forward/Center Operation

Throughout the preceding discussion, the transmission 10 has been explained and illustrated with the shift lever 14 extending into cooperation with the forward notches 20a, 21a, 22a, and 30a of the associated rails 20, 21, 22, and 30. When configured in this manner, the shift lever 14 extends upwardly from the forward portion of the transmission 10. However, as is well known in the art, it is sometimes desirable to have the shift lever extend upwardly from the central portion of the transmission 10. In the past, this has been accomplished by reversing the orientation of the shift housing 12 one hundred eighty degress relative to the case 11. Thus, in this structure, the shift lever 14 would extend into cooperation with the rearward notches 20b, 21b, 22b, and 30b of the associated rails 20, 21, 22, and 30. At the same time, the automatic shift member 32 and the manual shift member 40 would extend into cooperation with the forward notches 20a, 21a, 22a, and 30a of the associated rails 20, 21, 22, and 30.

As discussed above, the outer surface of the flange 43 is also formed having a second recess 45 and associated non-recessed surface 45a. When the transmission 10 is configured for operation as described and illustrated above, the recess 45 and non-recessed surface 45a are unused. However, when the transmission 10 is re-configured by reversing the orientation of the shift housing 12, the recess 45 and non-recessed surface 45a are employed by the automatic shift position sensor 90 to selectively generate the first and second electrical output signals, instead of the recess 44 and non-recessed surface 44a.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A transmission comprising:

an input shaft;

an output shaft;

a gear engaging mechanism selectively operable in a first condition, wherein said input shaft is not connected to said output shaft, and a second condition, wherein said input shaft is connected through said gear engaging mechanism to said output shaft;

a shift rail movable between a first shift rail position, wherein said gear engaging mechanism is operated in said first condition, and a second shift rail position, wherein said gear engaging mechanism is operated in said second condition;

a shift shaft having a shift member mounted thereon for rotation with said shift shaft and for axial movement relative thereto between a first shift member position, wherein said shift member is engaged with said shift rail, and a second shift member position, wherein said shift member is disengaged from said shift rail;

means for selectively rotating said shift shaft when said shift shaft is located in said first shift member position so as to cause movement of said shift rail between said first and second shift rail positions; and means responsive to rotation of said shift member for generating a signal which is representative of the relative position of said shift rail.

2. The transmission defined in claim 1 wherein said means for selectively rotating includes means for connecting said shift member to said shift shaft for movement therewith.

3. The transmission defined in claim 2 wherein said means responsive to movement of said shift shaft includes a magnet connected for movement with said shift shaft and a sensor responsive to movement of said magnet for generating said electrical signal.

4. The transmission defined in claim 2 wherein said means responsive to movement of said shift shaft includes a plurality of magnets connected for movement with said shift shaft and a sensor responsive to movement of said magnets for generating said electrical signal.

5. The transmission defined in claim 4 wherein said magnets have differing polarities.

6. The transmission defined in claim 2 wherein said means responsive to movement of said shift shaft includes a plurality of magnets connected for movement with said shift shaft and a plurality of sensors responsive to movement of said magnets for generating said electrical signal.

7. The transmission defined in claim 6 wherein said magnets have differing polarities.

8. The transmission defined in claim 1 further including means for moving said shift member between said first and second shift member positions.

9. The transmission defined in claim 8 wherein said means for moving includes a first chamber, a first piston slidably disposed within said first chamber, and means for urging said first piston into engagement with said shift member so as to move said shift member from said first shift member position to said second shift member position.

10. The transmission defined in claim 9 wherein said means for urging said first piston includes a source of pressurized fluid and means for selectively providing communication between said source of pressurized fluid and said first chamber.

11. The transmission defined in claim 9 wherein said means for moving further includes a second chamber, a second piston disposed within said second chamber for sliding movement, and means for urging said second piston into engagement with said shift member so as to move said shift member from said second shift member position to said first shift member position.

12. The transmission defined in claim 11 wherein said means for urging said second piston includes a source of pressurized fluid and means for selectively providing communication between said source of pressurized fluid and said second chamber.

13. The transmission defined in claim 8, wherein said means for moving includes a first chamber, a first piston slidably disposed within said first chamber, a second chamber, a second piston slidably disposed within said second chamber, means for selectively urging said first piston into engagement with said shift member so as to move said shift member from said first shift member position to said second shift member position, and means for selectively urging said second piston into engagement with said shift member so as to move said shift member from second shift member position to said first shift member position.

14. The transmission defined in claim 13 wherein said means for selectively urging includes a source of pressurized fluid and means for selectively providing communication between said source of pressurized fluid and said first and second chambers.

15. The transmission defined in claim 2 wherein said means responsive to movement of said shift member for generating a signal which is representative of the relative position of said shift rail is responsive to movement of said shift shaft for generating said signal.

16. The transmission defined in claim 1 wherein said shift member is rotatably movable between said first shift member position and said second shift member position.

17. The transmission defined in claim 16 wherein said means for selectively moving said shift member is effective for selectively rotating said shift member when located in said first shift member position so as to cause movement of said shift rail between said first and second shift rail positions.

18. The transmission defined in claim 17 wherein said means responsive to movement of said shift member is responsive to rotational movement of said shift member for generating said signal which is representative of the relative position of said shift rail.

19. The transmission defined in claim 1 wherein said means responsive to movement of said shift member generates an electrical signal which is representative of the relative position of said shift rail.

20. A transmission comprising:

an input shaft;

an output shaft;

a gear engaging mechanism selectively operable in a first condition, wherein said input shaft is not connected to said output shaft, and a second condition, wherein said input shaft is connected through said gear engaging mechanism to said output shaft;

a shift rail movable between a first shift rail position, wherein said gear engaging mechanism is operated in said first condition, and a second shift rail position, wherein said gear engaging mechanism is operated in said second condition;

an idler rail movable between a first idler rail position and a second idler rail position;

a rotatable shift shaft;

an automatic shift member mounted on said shift shaft for rotation therewith and for axial movement relative thereto between first and second shift member positions, said automatic shift member being not engaged with said shift rail when located in said first shift member position and being engaged with said shift rail when located in said second shift member position;

a manual shift member mounted on said automatic shift member for axial movement therewith and for rotational movement relative thereto between said first and second shift member positions, said manual shift member being engaged with both said idler rail and said shift rail when located in said first shift member position and being engaged only with said shift rail when located in said second shift member position;

means for rotating said shift shaft when said automatic shift member and said manual shift member are located in said first shift member position so as to cause movement of said shift rail between said first and second shift rail positions; and means for moving said idler rail between said first and second idler rail positions when said automatic shift member and said manual shift member are located in said second shift member position so as to cause movement of said shift rail between said first and second shift rail positions.

* * * * *